(12) United States Patent
Tschuppert et al.

(10) Patent No.: US 11,608,250 B2
(45) Date of Patent: Mar. 21, 2023

(54) METHOD AND DEVICE FOR MONITORING AN ELEVATOR CAR DOOR

(71) Applicant: Inventio AG, Hergiswil (CH)

(72) Inventors: Reto Tschuppert, Lucerne (CH); Martin Kusserow, Lucerne (CH)

(73) Assignee: INVENTIO AG, Hergiswil (CH)

( * ) Notice: Subject to any disclaimer, the term of this patent is extended or adjusted under 35 U.S.C. 154(b) by 865 days.

(21) Appl. No.: 16/482,321

(22) PCT Filed: Mar. 22, 2018

(86) PCT No.: PCT/EP2018/057328
§ 371 (c)(1),
(2) Date: Jul. 31, 2019

(87) PCT Pub. No.: WO2018/177891
PCT Pub. Date: Oct. 4, 2018

(65) Prior Publication Data
US 2019/0352134 A1 Nov. 21, 2019

(30) Foreign Application Priority Data
Mar. 27, 2017 (EP) ..................................... 17163131

(51) Int. Cl.
*B66B 13/02* (2006.01)
*B66B 13/26* (2006.01)
(Continued)

(52) U.S. Cl.
CPC ............ *B66B 13/02* (2013.01); *B66B 5/0018* (2013.01); *B66B 9/00* (2013.01); *B66B 13/26* (2013.01); *B66B 19/007* (2013.01); *G01C 3/00* (2013.01)

(58) Field of Classification Search
CPC ..... B66B 13/26; B66B 5/0012; B66B 5/0031; B66B 1/3492; B66B 5/0037;
(Continued)

(56) References Cited

U.S. PATENT DOCUMENTS 4,029,176 A * 6/1977 Mills ....................... E05F 15/43
340/565
5,420,430 A * 5/1995 Trett ....................... B66B 13/26
250/221
(Continued)

FOREIGN PATENT DOCUMENTS

CA 2519058 C 7/2012
CH 696785 A5 * 11/2007 ............. B66B 13/26
(Continued)

*Primary Examiner* — Marlon T Fletcher
(74) *Attorney, Agent, or Firm* — William J. Clemens; Shumaker, Loop & Kendrick, LLP

(57) ABSTRACT

A method and a device for monitoring an elevator car door acquire one or more distances based on light emitted toward the car door by a distance measuring device and reflected at the car door as a function of a current closed state of the car door. Information about the current closed state of the car door is derived solely by comparing the acquired distance with a previously acquired reference distance, and a signal which represents the information can be fed to a remotely arranged control center. The monitoring device can be installed as a retrofit component that is capable of working autonomously in existing elevator systems, does not need to receive any data from a controller of the car door or the elevator system and only requires a relatively simple data processing device that only needs to carry out a comparison of detected distance values with reference values.

16 Claims, 2 Drawing Sheets

(51) Int. Cl.
*B66B 9/00* (2006.01)
*B66B 19/00* (2006.01)
*B66B 5/00* (2006.01)
*G01C 3/00* (2006.01)

(58) Field of Classification Search
CPC ..... B66B 5/0018; B66B 13/14; B66B 5/0006; B66B 5/00; B66B 13/143; B66B 13/22; B66B 3/02; B66B 13/00; B66B 1/00; B66B 13/02; B66B 13/16
See application file for complete search history.

(56) References Cited

U.S. PATENT DOCUMENTS

| | | | |
|---|---|---|---|
| 6,167,991 B1 * | 1/2001 | Full | G01V 8/20 49/25 |
| 6,392,537 B1 | 5/2002 | Tazumi et al. | |
| 2003/0168288 A1 | 9/2003 | Deplazes et al. | |
| 2017/0015521 A1 | 1/2017 | Toutaoui | |

FOREIGN PATENT DOCUMENTS

| | | | | |
|---|---|---|---|---|
| CN | 1443703 A | | 9/2003 | |
| CN | 1759613 A | | 4/2006 | |
| CN | 101353129 A | | 1/2009 | |
| CN | 104724566 A | * | 6/2015 | ............... B66B 5/00 |
| CN | 106068237 A | | 11/2016 | |
| CN | 108002190 A | * | 5/2018 | |
| CN | 110002311 A | * | 7/2019 | |
| DE | 19900139 A1 | * | 7/1999 | ............. B66B 13/26 |
| EP | 1345444 B1 | | 3/2006 | |
| EP | 2022745 B1 | * | 2/2018 | ............. B66B 13/26 |
| GB | 2552382 A | * | 1/2018 | ........... B66B 13/146 |
| JP | 2007314285 A | | 12/2007 | |
| JP | 2016104656 A | | 6/2016 | |
| WO | WO-8703100 A1 | * | 11/1986 | |
| WO | WO-9635630 A1 | * | 11/1996 | ............. B66B 13/14 |
| WO | 2004084556 A1 | | 9/2004 | |
| WO | WO-2006018920 A1 | * | 2/2006 | ............. B66B 13/26 |
| WO | WO-2007108089 A1 | * | 9/2007 | ............. B66B 13/26 |
| WO | WO-2009142610 A1 | * | 11/2009 | ............. B66B 13/26 |
| WO | 2016139203 A1 | | 9/2016 | |
| WO | WO-2018177891 A1 | * | 10/2018 | ............. B66B 13/02 |

* cited by examiner

METHOD AND DEVICE FOR MONITORING AN ELEVATOR CAR DOOR

FIELD

The present invention relates to a method and to a device by means of which an elevator car door can be monitored with regard to its current closure state, in particular from a remote control center.

BACKGROUND

An elevator system can transport passengers within a building or structure by means of a relocatable elevator car. The elevator car has at least one elevator car door, which can be opened and closed in order to free or block access to the elevator car.

Among other things, it must be ensured that the elevator car door is correctly closed before the elevator car is relocated, since otherwise passengers who could enter or exit the elevator car through the incompletely closed elevator car door could be hurt by the elevator car moving with the car door partially open. For this purpose, usually one or more door switches are provided in elevator systems, which can exchange signals with a control unit of the elevator system, such that the control unit orders a relocation of the elevator car only when a correct complete closure of the elevator car door is signaled by the door switch.

Furthermore, measures are usually taken in elevator cars to prevent passengers from being obstructed or even injured by a closing elevator car door. For this purpose, for example, a light barrier or a light curtain can be used to detect whether a passenger is currently in the area of the elevator car door, such that, in this case, further closure of the elevator car door can be prevented or a closing process can even be reversed. Also, in this case, the light barrier or the light curtain is typically connected to the control unit of the elevator system such that it can decide, on the basis of correspondingly received signals, whether or how the elevator car door may be moved.

In conventional elevator systems it is thus usually provided by default to indicate a closure state of the elevator car door to the control unit of the elevator system based on signals which are, for example, generated by the door switch and/or the light curtain. However, in general, no measures have hitherto been taken in elevator systems by means of which, for example, it can be monitored whether the conditions which are to be monitored by the door switch and/or the light curtain are determined correctly and whether the corresponding signals are transmitted correctly to the control unit of the elevator system and thus the safe operation of the elevator system is ensured.

US 2003/168288 A1 describes a video monitoring system for monitoring an elevator car door. The monitoring system has a 3D sensor for capturing three-dimensional images of the elevator car door. For monitoring the elevator car door, deviations between different images are detected and evaluated.

SUMMARY

There may thus be a need for a method and/or device by which the elevator car door can be monitored in an alternative or complementary manner. In particular, there may be a need for a method for modernizing existing elevator systems in order to be able to monitor the elevator car door in an appropriate manner.

According to a first aspect of the invention, a method for monitoring an elevator car door is described. The method comprises at least the following steps: A distance is determined on the basis of light which is emitted by a distance measuring device in the direction of the elevator car door and reflected by the elevator car door depending on a current closure state of the elevator car door. Subsequently, information about the current closure state of the elevator car door is derived solely by comparing the determined distance with a previously determined reference distance. Finally, a signal representing this information is output.

According to a second aspect of the invention, a monitoring device for monitoring an elevator car is described which is configured to carry out the method according to the first aspect of the invention.

According to a third aspect of the invention, an elevator system is described which has an elevator car with an elevator car door and a monitoring device according to an embodiment of the second aspect of the invention.

According to a fourth aspect of the invention, a method for monitoring an elevator car door from a remote control center is described. The method comprises installing a monitoring device according to an embodiment of the second aspect of the invention adjacent to the car door and subsequently evaluating the signal output by the monitoring device in the control center in order to determine therefrom the information about the current closure state of the elevator car door.

According to a fifth aspect of the invention, a method for modernizing an elevator system is described which comprises installing a monitoring device according to an embodiment of the second aspect of the invention adjacent to an elevator car door of the elevator system.

Possible features and advantages of embodiments of the invention may be considered, inter alia and without limiting the invention, to be dependent upon the concepts and findings described below.

As already briefly noted in the introduction, the current closure state of an elevator car door in conventional elevator systems is generally monitored by means of monitoring components already installed in the elevator system by the manufacturer, in particular door switches. In addition to mechanical monitoring components, monitoring components that use other physical measuring principles have also been developed as an alternative. For example, WO 2004/084556 A1 describes a system for monitoring the space in the area of an elevator by means of a 3D sensor, by means of which, inter alia, the elevator car door may also be observed.

However, conventional measures for monitoring the closure state of the elevator car door have usually already been planned by the manufacturer of the elevator system and installed in the elevator system, and the signals generated by the particular monitoring component are transmitted to a control unit of the entire elevator system or at least to a control unit of the elevator car door, such that they may take into account the information about the current closure state of the elevator car door during the relevant control operation of the elevator system or the elevator car door. Additional transmission of these signals to other users was generally not provided. Furthermore, in the space monitoring described in WO 2004/084556 A1, relatively complex data processing was necessary in order to be able to retroactively infer from 3-dimensional image data the current closure state of the elevator car door.

It has now been recognized that it may be advantageous to not only make the information about the current closure state of the elevator car door available to other components of the elevator system itself, but also to be able to retrieve it externally. In particular, it has been found advantageous to make this information retrievable in a remote control center. As a result, for example, conclusions about the correct functioning of the elevator system may already be drawn from the control center. Based on this, for example, maintenance or repair measures may be initiated.

In particular, it has been found advantageous to be able to retrofit existing elevator systems with such a possible device for the external monitoring of closure states of the elevator car door. Among other things, there may be the problem that, for example, in the case of third-party products, i.e. elevator systems which were planned and installed by another manufacturer, sufficient information about the functionalities of monitoring components already integrated therein by the manufacturer is not available. In particular, there is no provision in existing elevator systems for making information on the current closure state of the elevator car door, which is indeed available within the elevator system, externally available for example via interfaces which have been provided in advance.

With the method presented here or the correspondingly configured monitoring device, an option is described for making it possible to obtain information about a current closure state of an elevator car door, in particular in existing elevator systems, and to make a signal which reproduces this information externally available, this option being relatively simple to implement. For example, the signal can be forwarded to a remote control center and evaluated there. In this case, in particular in contrast with the approach described in WO 2004/084556 A1, the aim is to be able to implement the monitoring method by the simplest possible technical means and/or with the simplest possible signal evaluation.

In order to achieve these specifications, it is proposed, inter alia, to use a distance measuring device which is comparably simple in design and cost-effective to produce for monitoring the elevator car door and to evaluate its measurement result preferably by means of an evaluation device which is also comparatively simple in design and cost-effective to produce.

The distance measuring device can measure distances or depth information based on optical measuring principles. For this purpose, the distance measuring device can emit light in the direction of the elevator car door or toward an opening of the elevator car to be closed by the elevator car door. Depending on the closure state which the elevator car door is currently in, at least part of this emitted light is reflected by a surface of the elevator car door and may be detected again by the distance measuring device. Based on this detected reflected light, the distance measuring device may infer the distance of a surface reflecting the light using various physical measuring principles. This information about the distance of a surface reflecting the emitted light may then be used to obtain the desired information about the current closure state of the elevator car door.

It is assumed that, in the event that the elevator car door is completely or at least partially closed, a substantial portion of the light emitted therefrom is reflected by the surface of the elevator car door facing the distance measuring device. In this case, the distance measuring device thus measures a distance towards the reflective surface of the elevator car door. However, if the elevator car door is not or at least not completely closed, the part of the emitted light which would be reflected by the surface of the elevator car door when it is closed is not reflected, or is at best reflected by a surface therebehind, for example a surface in a corridor or room behind the elevator car door. In this case, the distance measuring device does not measure the distance to the elevator car door, but up to the reflective surface therebehind. By comparing the determined distance with a previously determined reference distance, it is thus possible to draw conclusions about the current closure state of the elevator car.

In other words, according to one embodiment of the invention, the monitoring device described herein may comprise an optically operating distance measuring device and an evaluation device. In this case, the distance measuring device may be configured to determine a distance to the object on the basis of emitted light which is reflected by an object. The evaluation device may be configured to derive information about the current closure state of the elevator car door solely by comparing at least one distance determined by the distance measuring device with a previously determined reference distance, and to output a signal representing this information.

It should be emphasized in this context that, in order to monitor the elevator car door, it would generally be inadequate simply to transmit light in the direction of the elevator car door and check whether or not parts of this light are reflected by the elevator car door to infer whether the elevator car door is closed, open or partially open. In such a method, which would only monitor the presence or absence of reflected portions of the emitted light, frequent errors would be expected. In particular, with the elevator car door open, although the emitted light could not be reflected by the elevator car door, it could be reflected by other objects and/or at passengers, and therefore a closed elevator car door would erroneously be assumed.

In order to exclude in particular such possibilities of error, it is therefore proposed not only to detect or analyze the existence of reflected light, but to specifically analyze the detected reflected light in order to derive therefrom information about the distance of the surface by which the light was reflected. This distance information may then provide a much more reliable indication of whether the elevator car door is open, closed or partially open. Disturbances in particular by objects or persons in the elevator car may be excluded with high reliability.

In order to make an evaluation of the distance determined by the distance measuring device as simple as possible and thus to be able to implement the monitoring device in a technically simple manner, it is proposed to compare this distance only with a previously recorded reference value, i.e. a reference distance. In particular, it may be sufficient to detect whether or not the currently measured distance substantially corresponds to the previously determined reference distance, optionally taking into account suitably selected tolerances.

The reference distance may preferably be a previously determined distance between the distance measuring device and the elevator car door in a completely or at least partially closed state. If, during subsequent operation of the monitoring device, a distance is thus measured that corresponds to the reference distance, it may be assumed that the light emitted by the distance measuring device was actually reflected by the elevator car door, which thus may be assumed to be partially or completely closed. If a greater distance is measured, it may be assumed that the elevator car door is open or at least partially open and the emitted light is reflected by an object therebehind it or a wall therebehind.

In this case, a complete lack of light reflected back is usually interpreted to mean that a back-reflecting surface at an infinite distance is assumed.

If a distance smaller than the reference distance is determined, it is highly likely that this is due to a disturbance on account of, for example, a reflection from a surface inside of the elevator car, but not from the surface of the elevator car door. Even if no information about the actual closure state of the elevator car may be derived in this case, it is at least recognized that there is a disturbance.

According to one embodiment, the reference distance may be determined in a previous calibration procedure by including at least one distance reference value while the elevator car door is in a predefined state.

By means of the calibration procedure, the distance which is set in the predefined state of the elevator car door may thus be determined by means of the distance measuring device.

In particular, it may be preferable to determine the distance that results for the distance measuring device when the elevator car door is completely closed as the distance reference value. In the case of such a distance reference value, it may be sufficient during the subsequent monitoring of the elevator car door to compare the currently measured distance only qualitatively, in particular only in binary (i.e. with a yes/no query), with the distance reference value. In other words, it may then suffice merely to detect whether or not the currently measured distance value is greater than the distance reference value. If this is true, it may be assumed that the elevator car door is at least partially open. If this is not true, it may additionally be checked whether or not the currently measured distance value is smaller than the distance reference value. If this is true, it may be assumed that the light is not reflected by the elevator car door, but by an object located inside the elevator car. Only in the event that it is detected that the distance actually measured corresponds to the distance reference value, within tolerances, may it be assumed that the elevator car door is in the same closed state as it was during the calibration procedure. A quantitative evaluation of the currently measured distance is not necessary. This allows a relatively simple technical implementation of the monitoring method, since the purely qualitative comparison of the currently measured distance with the reference distance is technically easier to implement than a quantitative determination of the same.

According to one embodiment of the method proposed herein, a plurality of distances are determined with respect to a plurality of juxtaposed positions along a surface facing the distance measuring device. Information about the current closure state of the elevator car door is then derived solely by comparing the plurality of determined distances each with an associated previously determined reference distance ($d_c$). The derived information includes information about a current state of motion of the elevator car door, that is, it indicates whether or how far the elevator car door is closed. A signal representing this information may in turn be output to an external location.

When applied to an embodiment of the monitoring device proposed herein, this may mean that the distance measuring device is configured to determine a plurality of distances to an object with respect to a plurality of juxtaposed positions along a surface of the object facing the distance measuring device. In this case, the evaluation device may be configured to derive information about the current closure state of the elevator car door solely by comparing the plurality of determined distances each with an associated previously determined reference distance, this derived information also containing information about the current state of motion of the elevator car door. The evaluation device is in turn designed to output a signal representing this information.

In other words, it may be advantageous not only to determine from the distance measuring device a distance with respect to a single position on a surface which reflects emitted light, but to carry out a distance determination for a plurality of juxtaposed positions.

For example, the distance device may emit light, for example in the form of a plurality of light beams or a light band, in a plurality of directions towards the elevator car door, such that, for example when the elevator car door is completely closed, each of the corresponding light beams is reflected from one of other positions that are adjacent to each other by the surface of the elevator car door. For each of these positions, a corresponding reference value, that is to say a corresponding reference distance, may have previously been determined, for example as part of a calibration procedure. If the currently measured distances for each of the positions substantially correspond to the reference distance, it may be assumed that the elevator car door is completely closed. However, if this only applies to some of the positions, it may be concluded that the elevator car door is currently not or at least not completely closed.

In particular, if it is inferred that the elevator car door is only partially closed, it may be concluded with high probability that the elevator car door is currently in the process of being moved.

In order to be able to infer even more reliably the current state of motion of the elevator car door, a plurality of such distance measurements may be carried out in chronological succession. If it is detected that, for example, the number of those positions for which the currently measured distance corresponds to the reference distance changes, a conclusion as to whether the elevator car door is currently being opened or whether it is currently being closed may be derived from this with high probability.

Thus, by measuring and comparing current distances with respect to a plurality of adjacent positions, not only information about whether the elevator car door is closed or not may be obtained, but also extended information may be obtained as to whether the elevator car door is in a partially closed state, and possibly even as to whether or in which direction the elevator car door is currently being moved, i.e. whether it is currently being closed or currently being opened.

Such extended information, in addition to monitoring whether the elevator car door is correctly opened or closed, also allows a statement as to whether the elevator car door is moved as provided for.

For example, it can be detected if the elevator car door is moved too slowly, for example due to mechanical defects. In addition, statements about the current functioning of other functionalities in the elevator system may be made on the basis of this extended information.

For example, based on the information about the current state of motion of the elevator car door, a conclusion about the correct functioning of a light curtain on the elevator car may also be drawn indirectly. For example, if it is detected that a person is inside the car door area to be closed by the car door, but it is nevertheless observed that the information about the current state of motion indicates that the elevator car door is currently being closed, it may be assumed with high probability that the functionality of the light curtain is currently faulty. Whether a person is inside the light curtain of the elevator car may possibly even be detected by means of the monitoring device on the basis of correspondingly carried out distance measurements.

According to one embodiment of the monitoring device, the distance measuring device is configured to emit light in the form of a light band that extends transversely to a direction of light propagation in a width direction, and to detect light reflected from a plurality of positions along the light band coming into contact with the object, and to determine therefrom the distance to the object with regard to each of the positions.

In other words, it may be advantageous that the distance measuring device does not emit light beams which illuminate substantially in a punctiform manner simultaneously or successively in the direction of different positions on a surface of an object facing the distance measuring device, but rather emits a kind of light band which extends in the direction, which is herein referred to as the width direction, transversely to the direction of light propagation, for example, to illuminate a linear band-shaped area of an object to be measured. Light which is then reflected at different positions along this light band may be detected and analyzed in terms of for example its time of flight in order to be able to determine the distance of the corresponding position in the light band from the distance measuring device. For the use of monitoring an elevator car door, the light band may for example extend transversely across the elevator car door, preferably in a direction parallel to the direction of movement of the elevator car door as it opens and closes.

According to one embodiment, the monitoring device according to an embodiment may comprise a distance measuring device, which is designed as a scanner providing depth information.

Such a scanner providing depth information is sometimes also referred to as a structured-light 3D scanner and is designed to measure the three-dimensional shape of an object using a projected light pattern and a camera. Projecting a light band onto a three-dimensionally shaped surface thereby produces a line of illumination which appears distorted from a different perspective than that of the projector and may be used for an exact geometric reconstruction of the surface shape. In particular, distances for positions along this light band may thereby be determined in a simple manner.

Alternatively, according to one embodiment, the distance measuring device of the monitoring device may be designed as a TOF camera (time of flight) providing depth information.

TOF cameras are 3D camera systems that can measure distances using a time-of-flight method. Due to their detector technology, they are sometimes also called PMD (Photonic Mixer Device) cameras and illuminate a surface to be measured by means of a light pulse. The TOF camera measures, for each pixel, a time that the emitted light needs to reach the surface of the object and arrive back at the camera. From the measured time, the distance to the object may be derived. In this case, the entire surface to be measured may be illuminated and measured all at once, and it is not necessary, as in the case of a scanner, to guide light beams or light bands over the surface in a scanning manner. The use of a TOF camera for the monitoring tasks described herein may on the one hand be implemented relatively easily on the technical side. On the other hand, the TOF camera may also take on other tasks within the elevator system. For example, using the TOF camera, a number of passengers in the elevator car could be counted and their total mass estimated.

According to one embodiment, the light used by the distance measuring device to measure distances may be infrared light (IR). Since such IR light having wavelengths of, for example, more than 900 nm is not visible to passengers, disturbances or irritations experienced by the passengers may be avoided in this way.

According to one embodiment, the monitoring device in particular has no means for a data exchange with a control unit of the elevator car door and/or with a control unit of an elevator system containing the elevator car door.

In other words, the monitoring device proposed herein may be specifically designed as a structural component that is easy to retrofit in existing elevator systems. It may be used in such existing elevator systems particularly advantageously for monitoring the elevator car door, as in these elevator systems a signal output from the elevator control unit or car door control unit is usually not provided or is hard to pick up, or it may at least not be understood/hardly be understood which control signals are used by such a control unit to control the elevator system or the elevator car door.

On account of the fact that the monitoring device is designed specifically to be able to operate without a data exchange with the control unit of the elevator car door or the elevator system, the monitoring device may be used especially as an autonomous retrofit component in an elevator system. For this purpose, the monitoring device may preferably have its own power supply, for example based on a battery, and/or preferably have only a single data interface via which the signals output by the evaluation device may be output, for example, to the remote control center.

It should be noted that some of the possible features and advantages of the invention are described herein with respect to different embodiments, in particular with reference to a method according to the invention or a monitoring device according to the invention for monitoring an elevator car, in particular from a remote control center, or a method for modernizing an elevator system. A person skilled in the art recognizes that the features may be combined, transferred, adapted or replaced as appropriate in order to arrive at further embodiments of the invention.

Embodiments of the invention will be described in the following with reference to the accompanying drawings, with neither the drawings nor the description being intended to be interpreted as limiting the invention.

The drawings are merely schematic and not to scale. Like reference signs refer in different drawings to like or analogous features.

DETAILED DESCRIPTION

Figure 1:
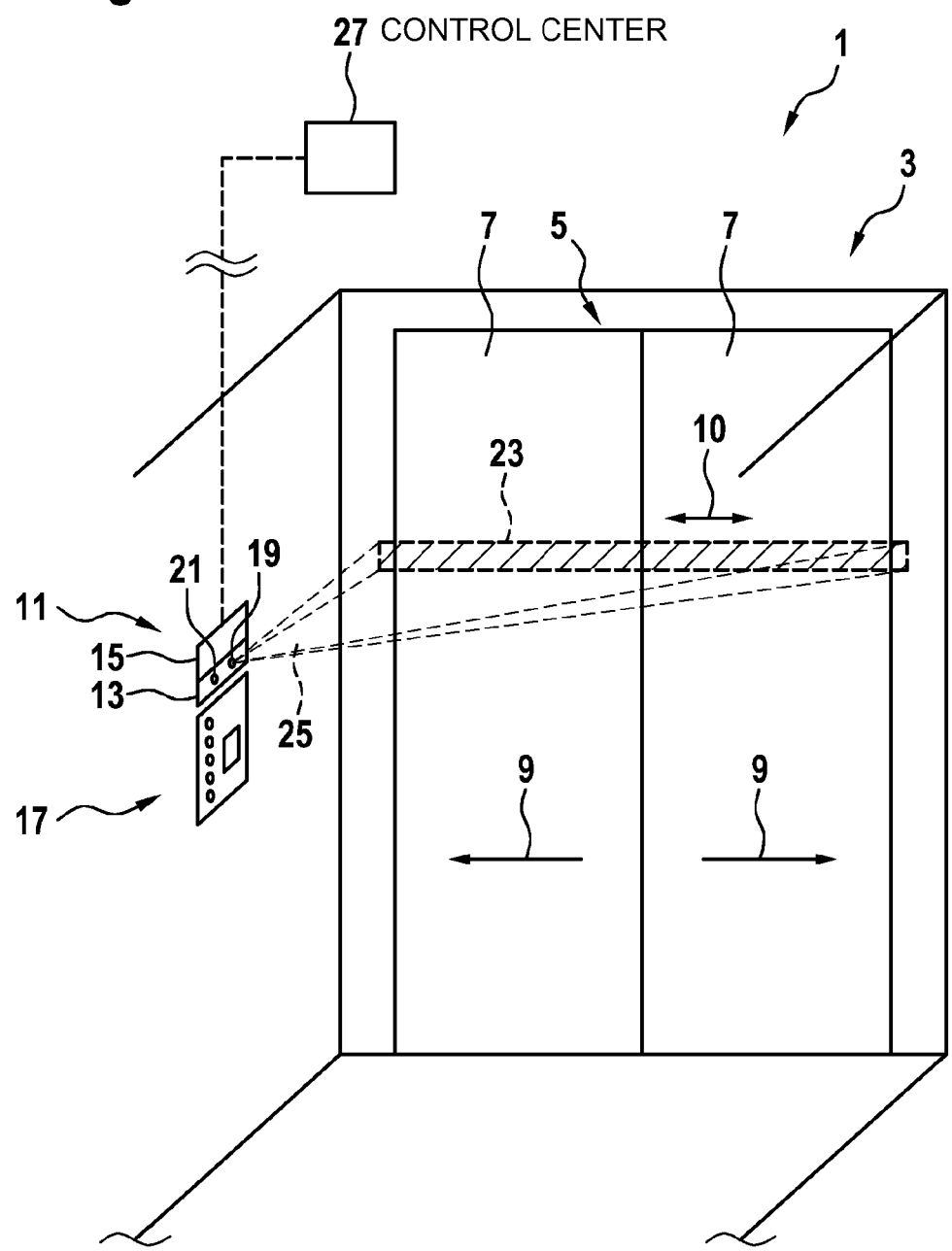
FIG. 1 shows a perspective view of an elevator car with a monitoring device according to an embodiment of the present invention.

FIG. 1 shows a perspective view into the interior of an elevator car 3 of an elevator system 1 with a monitoring device 11 according to an embodiment of the present invention. The elevator car 3 has an elevator car door 5, in which two door leaves 7 may be moved in opposite directions 9 for opening or closing. A drive of the elevator car door 5 is controlled in this case by an associated control unit (not shown) which may be provided in the elevator car 3 or elsewhere within the elevator system 1.

In order to be able to monitor a current closure state of the elevator car door 5, the monitoring device 11 is provided inside the elevator car 3. In the example shown, the monitoring device 11 is arranged above a car operating panel 17. Alternatively, however, the monitoring device 11 may also be arranged at another location within the elevator car 3, for example in the middle or at the rear end of a ceiling of the elevator car 3.

The monitoring device 11 has a distance measuring device 13 and an evaluation device 15. The distance measuring device 13 has an optical system 19, in which a light source such as a laser light source and optical components such as lenses, mirrors, etc. are provided. The optical system 19 is designed to emit one or more light beams 25 in the direction of the elevator car door 5.

In the example shown, the light 25 is emitted by the optical system 19 such that a light band 23 is projected transversely across the elevator car door 5. The light band 23 extends in a width direction 10 extending in parallel with the directions of movement 9 of the elevator car door 5.

The distance measuring device 13 also has a detection unit 21 to detect light, for example in the form of a photodetector. With the aid of the detection unit 21, light which is reflected back from the surface of the elevator car door 5 in the area of the projected light band 23 can be detected.

On the basis of data provided by the distance measuring device 11, one or more distances between the distance measuring device 13 and various positions along the surface of the elevator car door 5 illuminated by the light band 23 may then be deduced. For this purpose, in particular a time of flight of the emitted and back-reflected light can be measured and from this the distance can be calculated.

Alternatively, the distance measuring device can also determine the desired distance measurements using other optical measuring methods. Such optical measuring methods are sometimes referred to as range imaging and may include for example methods of stereo triangulation, sheet-of-light triangulation, light structuring, time-of-flight measurement, interferometry or coded aperture.

The distance measuring device 13 can forward the information measured by it on the distances to the evaluation device 15. There, these determined distances may be compared with one or more previously determined reference distances. On the basis of such a comparison, information about the current closure state of the elevator car door 5 may then be derived and such information may be forwarded by the monitoring device 11 in the form of a signal to another device, such as a control center 27 remote from the elevator system 1.

Figure 2:
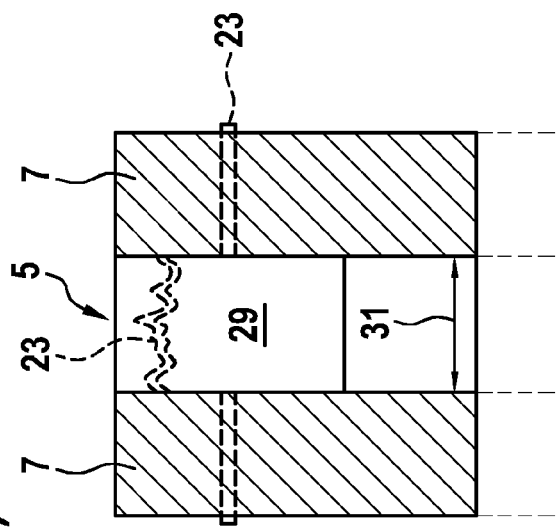
FIG. 2(a) and FIG. 2(b) show a plan view of an elevator car door monitored with respect to its closure state in two different closure states.
Figure 2:
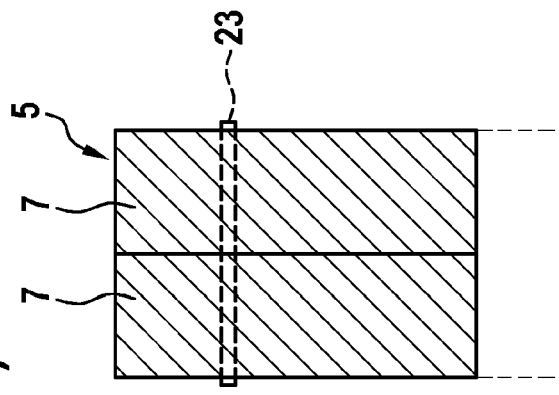

FIGS. 2(*a*), 2(*b*), 3(*a*) and 3(*b*) show two different closure states of an elevator car door 5 and the distance distributions measured in the two cases in the distance measuring device 13. In the figure part (a), the car door 5 is in the fully closed state, that is, the two door leaves 7 directly adjoin one another. In the figure part (b), the elevator car door 5 is partially opened, such that an open area between the two door leaves 7 opens up, through which an opening 31 is formed towards a corridor 29 therebehind.

In the fully closed closure state (a), in the example given, for each position x along the light band 23, an equal distance $d_c$ between the distance measuring device 13 and a surface reflecting the light 25 thereof is measured. In the closed state of the elevator car door, this distance $d_c$ corresponds to the distance between the distance measuring device 13 and the inwardly directed surface of the elevator car door 5. Optionally, this distance value $d_c$ may be measured once during a calibration procedure carried out in advance when the elevator car door 5 is securely closed, and stored as a reference value or reference distance.

Figure 3:
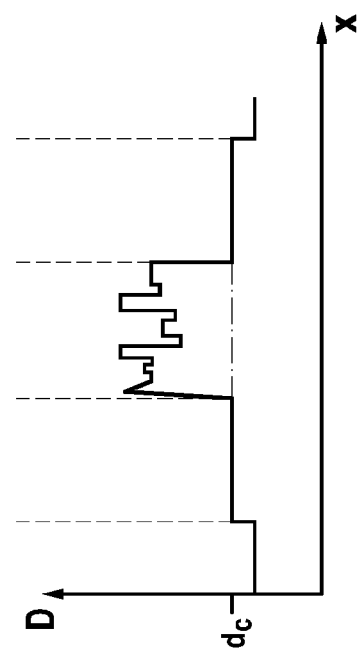
FIG. 3(a) and FIG. 3(b) show graphs which illustrate position-dependent distance measurements to surfaces of the elevator car door in the two closure states shown in FIG. 2(a) and FIG. 2(b) respectively.
Figure 3:
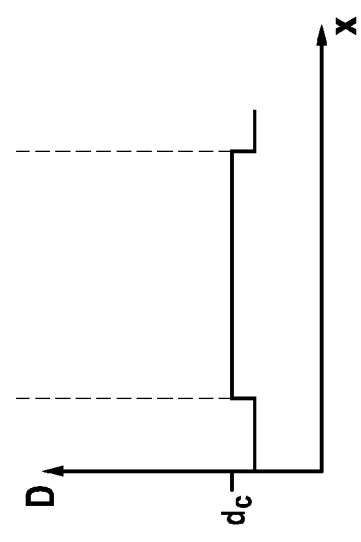

The position-dependent distance does not necessarily need to be the same for all positions, as shown in the example shown in FIG. 3(*b*), but may vary in a position-dependent manner. For example, in an embodiment in which the distance measuring device is arranged on a car side (as shown in FIG. 1), said distance may continuously increase from one side of the light band 23 to the other side.

In the partially open configuration of the elevator car door 5 shown in the figure part (b), the light band 23 reaches the not-completely-open elevator car door 5 only at its lateral edges and is reflected back there to the distance measuring device 13. However, in the opening 31 formed between the two door leaves 7, the light of the light band 23 enters the corridor 29 therebehind and is reflected back there by a wall or possibly other objects located there. A distance D to corresponding back-reflecting surfaces is considerably greater than the reference distance $d_c$.

By comparing the distances currently determined by the distance measuring device for a plurality of different positions along the light band 23 with the respective reference distances $d_c$, the evaluation device can thus deduce the current closure state of the elevator car door 5 and a signal representing such information may be suitably transmitted to the remote control center 27.

The closure state of the elevator car door 5 may advantageously be determined without the monitoring device 11 requiring data from a control unit of the elevator car door 5 or the entire elevator system 1. The monitoring device 11 may thus dispense with means for data exchange with such a control unit and may therefore be easily retrofitted in the form of an autonomously operating device, for example in an existing elevator system 1.

Signal processing capabilities of the monitoring device 11 and in particular of the evaluation device 15 thereof can in this case manage without a great deal of computing power and/or without computationally intensive algorithms. Instead, it may suffice that it is merely analyzed in the evaluation device 15 whether a currently determined distance is less than or equal to the reference distance $d_c$, or whether this distance is greater than this reference distance $d_c$. In the former case, it may generally be assumed that the elevator car door 5 is correspondingly closed, whereas in the second case, it may be assumed that the elevator car door 5 is open at least over the partial area for the positions of which correspondingly greater distances are measured.

The method proposed here and the correspondingly designed monitoring device 11 make a number of advantages possible.

In addition to the previously mentioned preferable lack of signal connection to the elevator control unit or the door control unit, in particular no prior knowledge of a special mode of operation of a door control unit used in an existing elevator is required. Thus, the monitoring device may be installed as a retrofit component in any elevator car to monitor the elevator car door there.

The monitoring device 11 manages with relatively inexpensive, simple hardware. The costs for the installation thereof, and in particular for wiring, may also be kept low.

Further, although the distance measuring device 13 may be formed similarly to a conventional image-providing camera system or scanner system, it may be specifically configured to perform only the specifically location-dependent distance measurement. Thus, unlike conventional video cameras, the use of such a monitoring device does not compromise passenger privacy, since although the generated images contain depth information and thus contain information about general shapes, they do not reproduce details such as faces or expressions.

In summary, a monitoring device 11 described herein may be installed as an autonomous retrofit component in existing elevator systems 1, it does not need to receive data from a control unit of the elevator car door 5 or the elevator system 1, and it manages with comparatively simple data processing which merely compares detected distance values with reference values.

Finally, it should be noted that the monitoring device proposed here may additionally be used for other purposes due to its property of being able to measure distances and thus to be able to specify depth information within a field of view.

For example, malfunctions e.g. in response to a defective light curtain can be detected. This may be done, for example, by observing that the elevator car door, when closing, touches an object in the door frame, such as a passenger, without first reversing its travel direction, rather than reversing its direction of movement before the elevator car door 5 touches the object, as would be expected with a properly functioning light curtain.

Further, using a camera providing depth information, numbers of passengers in the elevator car could be counted and, if necessary, their total mass estimated.

As a further option, obstacles which remain in the area of the elevator car door 5 for a longer period of time and may lead to a failure of the elevator system could be detected. Moreover, objects remaining in the elevator car over a longer period of time could be detected and, for example, the building management could be informed about this fact.

Finally, it should be noted that terms such as "comprising" and the like do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for monitoring an elevator car door, the method comprising the steps of:
    determining a distance based upon light emitted by a distance measuring device toward the elevator car door and light reflected by the elevator car door depending on a current closure state of the elevator car door;
    repeating the determining for a plurality of distances with respect to a plurality of juxtaposed positions along a surface facing the distance measuring device;
    deriving information about the current closure state of the elevator car door solely by comparing the determined distances with a previously determined reference distance; and
    outputting a signal representing the derived information.

2. The method according to claim 1 wherein the information about the current closure state of the elevator car door is derived solely by comparing each of the determined distances with an associated previously determined reference distance, the derived information containing information about a current state of motion of the elevator car door.

3. The method according to claim 1 including determining the reference distance in a previous calibration procedure by including at least one distance reference value while the elevator car door is in a predefined state.

4. A monitoring device for monitoring an elevator car door, the monitoring device comprising:
    a distance measuring device emitting light toward the elevator car door and receiving at least a part of the emitted light as light reflected by the elevator car door depending on a current closure state of the elevator car door, the distance measuring device determining a distance based upon the emitted light and the reflected light;
    wherein the distance measuring device is adapted to determine a plurality of distances to the elevator car door with respect to a plurality of juxtaposed positions along a surface of the elevator car door facing the distance measuring device;
    an evaluation device deriving information about the current closure state of the elevator car door solely by comparing the determined distance with a previously determined reference distance; and
    wherein the monitoring device outputs a signal representing the information.

5. The monitoring device according to claim 4 wherein the distance measuring device is an optically operating distance measuring device having an optical system emitting the light and a detection unit detecting the reflected light.

6. The monitoring device according to claim 4 wherein the evaluation device is adapted to derive the information about the current closure state of the elevator car door solely by comparing each of the determined distances an associated previously determined reference distance, wherein the derived Information contains information about a current state of motion of the elevator car door, and the output signal representing the current state of motion information.

7. The monitoring device according to claim 4 wherein the distance measuring device emits the light as a light band that extends transversely to a direction of light propagation in a width direction, detects the reflected light from a plurality of positions along the light band coming into contact with the elevator car door, and determines a distance to the elevator car door with regard to each of the positions.

8. The monitoring device according to claim 4 wherein the distance measuring device is a scanner that provides depth information for determining the distance.

9. The monitoring device according to claim 4 wherein the distance measuring device includes a TOF camera providing depth information for determining the distance.

10. The monitoring device according to claim 4 wherein the distance measuring device emits the light as infrared light.

11. The monitoring device according to claim 4 wherein the monitoring device is not adapted for data exchange with either a control unit of the elevator car door or a control unit of an elevator system containing the elevator car door.

12. An elevator system comprising: an elevator car with an elevator car door; and the monitoring device according to claim 4.

13. A method for monitoring an elevator car door from a remote control center, the method comprising the steps of:
    installing the monitoring device according to claim 4 adjacent to the elevator car door; and evaluating the signal output by the monitoring device in the remote control center to determine the information about the current closure state of the elevator car door.

14. The method according to claim 13 including calibrating the monitoring device by including at least one reference value as the reference distance while the elevator car door is in a predefined state.

15. A method for modernizing an elevator system comprising installing the monitoring device according to claim 4 adjacent to an elevator car door of the elevator system.

16. A monitoring device for monitoring an elevator car door, the monitoring device comprising:
a distance measuring device emitting light toward the elevator car door and receiving at least a part of the emitted light as light reflected by the elevator car door depending on a current closure state of the elevator car door, the distance measuring device determining a distance based upon the emitted light and the reflected light;
wherein the distance measuring device emits the light as a light band that extends transversely to a direction of light propagation in a width direction, detects the reflected light from a plurality of positions along the light band coming into contact with the elevator car door, and determines a distance to the elevator car door with regard to each of the positions;
an evaluation device deriving information about the current closure state of the elevator car door solely by comparing the determined distance at each of the positions with a previously determined reference distance; and
wherein the monitoring device outputs a signal representing the information.

* * * * *